UNITED STATES PATENT OFFICE.

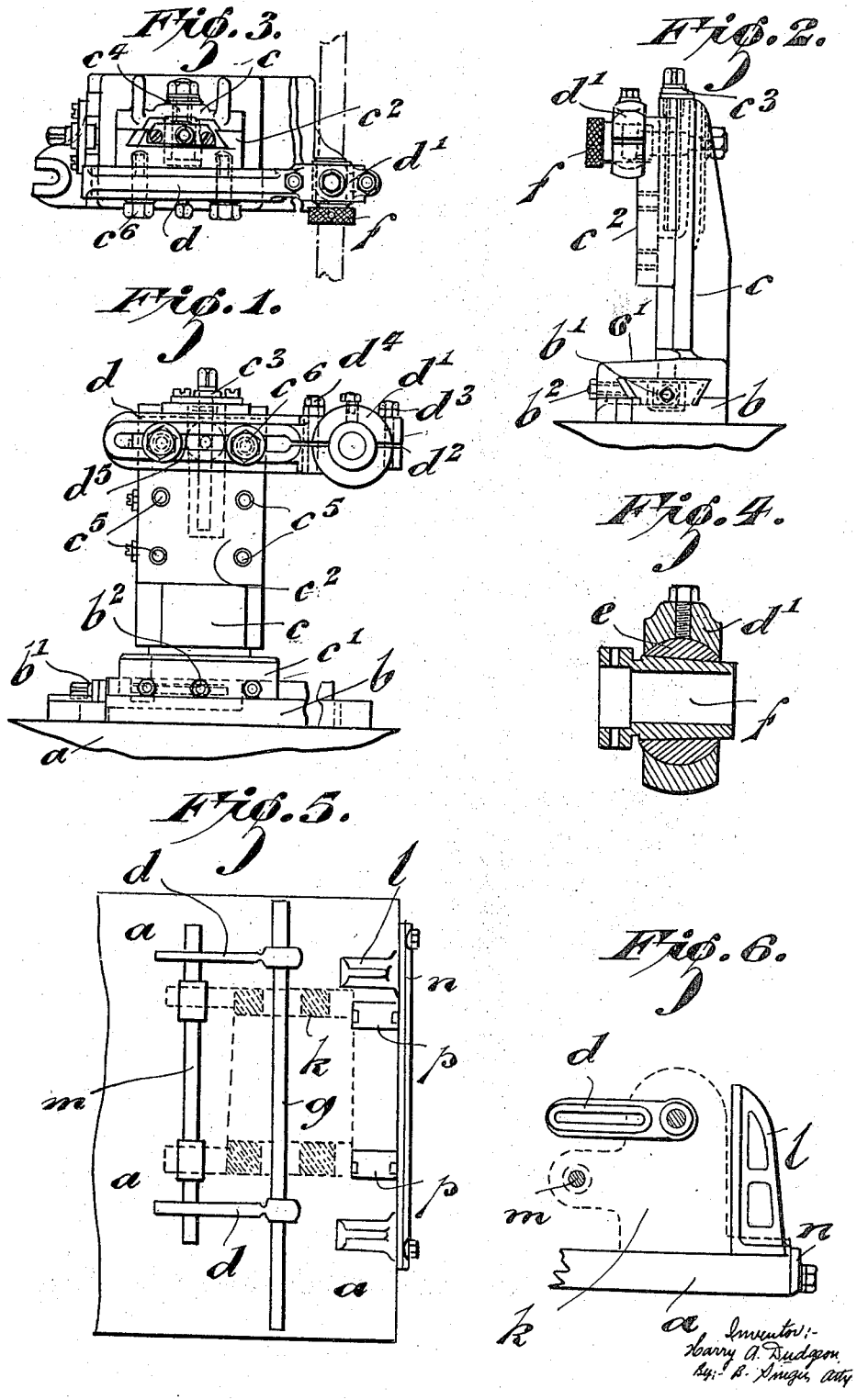

HARRY ALLSOP DUDGEON, OF COVENTRY, ENGLAND.

JIG DEVICE FOR BORING OR DRILLING PURPOSES.

1,300,828. Specification of Letters Patent. Patented Apr. 15, 1919.

Application filed November 21, 1918. Serial No. 263,584.

*To all whom it may concern:*

Be it known that I, HARRY ALLSOP DUDGEON, a subject of the Kingdom of Great Britain, residing at 12 Manor road, Coventry, in the county of Warwick, England, have invented a certain new or Improved Jig Device for Boring or Drilling Purposes, of which the following is a specification.

This invention relates to a new or improved jig device for boring or drilling purposes, which is particularly adapted for use in connection with any precision work which requires quick and accurate boring, one of the objects being to provide a device by which a skilled mechanic can set the jig independently of the boring machine, and thus enable the work and the jigs in the set position to be applied to the boring machine as one self-contained part, and by which means the boring may be effected by an unskilled workman, thus saving the time of the skilled mechanic during the operation of boring and enabling him to utilize such time in the setting up of a duplicate jig device for fresh work ready to be applied to the boring machine as soon as the boring of the previous work has been effected, the device consisting of a pair of brackets formed of standards adjustably secured to a base plate, each of which standards carries a projecting arm, the position of which is capable of vertical and horizontal adjustment, the projecting end of each arm being provided with a bush or socket for receiving a setting bar, such bushes or sockets being so mounted in the arms by ball and socket joints as to enable the bar to be set in any required position without the possibility of distortion of the bar in the setting.

After being set, the bar is removed from the bushes and the work which may consist of a jig in the case of a large number of duplicate articles of work requiring to be bored, or the work itself, in the case of a small number of articles to be bored, is fixed in the required position on the base plate, thus rendering the whole device including the work a self-contained unit ready for being attached to the boring machine, the relative positions of the boring tool and the device being so adjusted that the axis of the bushes is the same, or approximately the same, as the axis of the boring tool.

In order that this invention may be clearly understood and readily carried into practice, reference may be had to the appended explanatory sheet of drawings, upon which:—

Figure 1 is a front elevation of one of the standards.

Fig. 2 is a side elevation of Fig. 1.

Fig. 3 is a plan of Fig. 1.

Fig. 4 is a section through the ball and socket action for receiving the setting bar.

Fig. 5 is a plan in diagram of a portion of the base plate illustrating an example of setting the bar.

Fig. 6 is an elevation of Fig. 5.

In an embodiment of this invention the device comprises a base plate for receiving the work to be bored, at each end of which base plate, a plate $b$ forming one part of a horizontal slide is adjustably attached, the other part of such horizontal slide forming the base $c^1$ of a standard $c$, upon the face of which standard, a block $c^2$ is mounted to have a vertical sliding movement, upon this block the one end of a projecting arm $d$ is adjustably mounted in a manner hereinafter described, the other or projecting end of the arm $d^1$ being provided with a ball $e$ which is socketed in a circular bearing in the end $d^1$ of the arm $d$, so as to allow of a universal movement of the ball, the axis of the ball $e$ being formed to receive a flanged and interchangeable externally tapered bush $f$, the interior of which bush is of the required diameter of the setting bar and of the boring tool. The end of the arm is split at $d^2$ and provided with flanges, whereby the friction of the ball $e$ can be regulated or the ball can be locked by the tightening up of the flanges by a screw pin or pins $d^3$, $d^4$.

A screw $b^1$ is provided for the horizontal adjustment of the base $c^1$ of the standard upon the plate $b$, a similar screw $c^3$ is provided for the vertical adjustment of the block $c^2$ which carries the arm $d$.

The tightening of the vertical slide is effected in the length of the setting bar by the screw pin $c^4$, the tightening adjustment of the horizontal slide being effected in a similar direction by the pins $b^2$.

In the operation of setting up, a pair of the standards are arranged at required positions on the base plate $a$ with the arms $d$ approximately parallel to each other and the axes of the bushes in the arms approximately in alinement, the setting bar $g$ being then inserted through the bushes in the two arms. The position of the bar $g$ is then set through the medium of the vertical and horizontal slides in the standards $c$ to the position required for the bore in the jig or work $k$ as the case may be, such setting being regulated by vertical measurements from the base plate and by horizontal measurements from any suitable vertical square guide such as $l$ which is loose on the base plate and located from a strip $n$ attached to the edge of the plate $a$. In the resetting of the arms $d$ for the boring of another hole in a piece of work, several methods are possible. As the location of the first hole to the surface of the table $a$ and to the square $l$ is known, the setting bar for the second hole or subsequent holes can be set from the same surface to calculated distances, or a test bar $m$ can be fitted to the first bored hole and the setting bar adjusted to this in the usual way, while holes in the same horizontal line can be set in turn to the boring bar without making use of a setting bar, except for the first hole by using spacing pieces such as $p$ which vary in length by the amount of the distance between the centers. By this method, holes one inch apart can be insured by a series of spacing pieces $p$, 1, 2, 3 and 4 inches, and so on in length, the bar arms in such case remaining in one position for the whole of the holes. The universal ball joint in the ends $d^1$ of the arms enables the bar $g$ to be set with extreme accuracy without the possibility of any distortion of the bar in the process of setting. After the bar has been set in the required position to the required alinement, the bar $d$ is removed from the bushes $f$ and the jig or article $k$ to be bored is secured in the required position on the base plate $a$, the whole device including the jig or work to be bored being then ready for attachment to a boring machine, thus enabling the jig or work $k$ as the case may be to be accurately bored by an unskilled workman, while a duplicate device is being set by the skilled mechanic.

In the use of the device on a boring or drilling machine, the connection between the boring bars and the machine may be made by a universally jointed socket and shank, while the machine spindle is provided with a center to enable the spindle to be set concentric with the boring bars, although by such boring bars precise concentricity is not essential by reason of there being a slight amount of float possible in the joint connection, thus enabling the holes to be bored with the boring bar slightly out of alinement with the boring machine spindle.

The boring bars are of the type having a series of holes along their length for allowing of a cutter being inserted at the most convenient point of its length.

The bushes or sockets $f$ are made removable from the ball action $e$ so as to render them interchangeable with bushes or sockets suitable for receiving varying sizes of setting bars and boring bars to accommodate the requirements of varying sizes of bores.

In addition to the horizontal and vertical adjustment of the arms through the medium of slides on the standards, the arms $d$ are so secured to the blocks $c^2$ as to be capable of being adjusted to various positions on the blocks, this being rendered possible in the case of each arm by two vertical rows of say three tapped holes $c^5$, which are arranged in the blocks $c^2$ so as to receive the screw pins $c^6$, the end of the arm being provided with a longitudinal slot, the whole being so arranged that the arm can be adjusted to various positions by causing the slot in the arm to engage horizontally with the pair of projecting screw pins $a^6$ at an angle in whichever horizontal row of the tapped holes $c^5$ they may be inserted or by such slot being made to engage with one pin inserted in the hole of one row, and the other pin inserted in the hole of another row, as may be required for adjusting the position of the ball and socket end of the arm, the slot $d^5$ in the arm $d$ being of greater length than the distance between the screw pins, so as to allow of a longitudinal adjustment of the position of the arm in relation to the block.

What I claim as my invention and desire to secure by Letters Patent is:—

1. A jig device comprising a base, a standard, means interposed between such base and standard for rendering the latter movable in a horizontal plane with respect to the former, means incorporated within the standard for rendering the base adjustable in a vertical plane, a bracket secured to the standard and horizontally adjustable with respect thereto, each bracket being provided with a socket, which is universally adjustable, such socket being adapted to receive a removable setting bar for setting up the work, and to afterward locate the position for, and receive the machine boring bar or drill during the boring or drilling process.

2. A jig device as set forth in the preceding claim, and in which the bearing of the bush or socket in the bracket is comprised of a ball and socket action.

3. A jig device as set forth in claim 1, and in which the bush or socket for receiving the setting bar and boring tool or drill is externally tapered and is fitted into a tapered hole in the universal joint.

4. A jig device as set forth in claim 1, the brackets being mounted upon slides, which move both in a horizontal and a vertical plane, such slides being adapted to be adjusted in the direction of the length of the setting bar.

In witness whereof I have hereunto set my hand in the presence of two witnesses.

HARRY ALLSOP DUDGEON.

Witnesses:
 ARTHUR H. BROWN,
 EDGAR N. WHEELER.

Copies of this patent may be obtained for five cents each, by addressing the "Commissioner of Patents, Washington, D. C."